United States Patent [19]

Radmacher et al.

[11] 3,922,431

[45] Nov. 25, 1975

[54] ELEMENTS FOR THIN-LAYER CHROMATOGRAPHY

[76] Inventors: Edmund Radmacher, 27 Schillingstr.; Paul Wullenweber, 36 Graner Weg, both of, 516 Duren, Germany

[22] Filed: Feb. 17, 1972

[21] Appl. No.: 218,587

Related U.S. Application Data

[63] Continuation of Ser. No. 801,206, Feb. 20, 1969, abandoned.

[52] U.S. Cl. ............ 428/327; 73/61.1 C; 210/31 C; 210/198 C; 260/174 CL; 260/29.6 S; 260/29.6 H; 260/29.6 R; 260/41 A; 260/41 C; 428/520
[51] Int. Cl.² .......................................... B01D 15/08
[58] Field of Search ... 260/17.4 CL, 29.6 S, 29.6 H, 260/29.6 R, 29.7 S, 41 A, 41 C; 117/132 B, 138, 161 UZ; 73/61.1 C; 210/31 C, 198 C

[56] References Cited
UNITED STATES PATENTS

| | | | |
|---|---|---|---|
| 2,821,514 | 1/1958 | Sarbach et al. | 260/29.7 |
| 2,825,664 | 3/1958 | Huntsberger | 117/232 |
| 2,976,182 | 3/1961 | Caldwell et al. | 117/135.5 |
| 3,084,131 | 4/1963 | McEwan et al. | 260/29.6 |
| 3,240,740 | 3/1966 | Knapp et al. | 260/29.6 |
| 3,311,582 | 3/1967 | Sparks et al. | 260/29.4 |
| 3,314,911 | 4/1967 | Cull | 260/29.7 |
| 3,367,893 | 2/1968 | Halbartschlanger | 260/8 |
| 3,575,899 | 4/1971 | Pryor et al. | 260/17.4 |

OTHER PUBLICATIONS

Lederer et al., Chromatography 2nd BDT. (1957) pp. 23–24.

*Primary Examiner*—Lester L. Lee

[57] ABSTRACT

Elements for thin-layer chromatography are produced by suspending a finely divided sorbent in a liquid, adding a finely divided synthetic resin as a medium (with or without adding further liquid to the suspension), intimately stirring the mixture and producing a formable paste, forming the paste into the elements, preferably by applying this paste to a base and drying the same.

3 Claims, No Drawings

ELEMENTS FOR THIN-LAYER CHROMATOGRAPHY

This application is a continuation of Ser. No. 801,206, filed Feb. 20, 1969, and now abandoned.

BACKGROUND

Sorbents conventionally used for layer chromatography have low powers of adhesion and cohesion and the sorptive layers have little mechanical strength. On the other hand, the elements are not merely required to stand up to the conditions that obtain during the production of a chromatogram, they should also be capable before and after use of being stored, packed and handled without risk of damage, particularly since there is a demand for ready-made standardized elements and it is desirable to store the chromatograms and to keep them for documentation purposes. Particularly elements that consist of a flexible foil as a base, bearing a sorbent film, are required to be specially adherent and wear-resistant to permit such chromatographic foils to be manipulated without risk, despite their flexibility, and even bound in folders. Mechanical strength is an essential requirement in the case of elements in the form of thin discs, rods and so forth that lack a supporting base. Attempts have therefore been made to impart greater strength and power to adhere to a base by incorporating inorganic or organic binding media, such as gypsum and starch, in such elements.

However, for achieving sufficient wear resistance the proportions of inorganic binders (viz. gypsum) required are so large that the concentration of the sorbent is too greatly reduced. Moreover, gypsum as a binder is open to the further objection that it not only prevents the detection of calcium and sulphate ions but also those of substances that form sparingly soluble calcium salts or sulphates. Plates for layer chromatography produced with the aid of gypsum are not therefore universally applicable. Above all, the rapid setting of the gypsum prevents such elements for layer chromatography from being mechanically produced, since the prepared coating mass sets in a very few minutes.

Organic binders (viz. starch) that have hitherto been employed, such as starch paste, have the major drawback that the coatings are not universally sprayable for developing the chromatogram. When treated with strongly active reagents, like concentrated acids such as $H_2SO_4$ followed by heating, the sorbent layer darkens and the detection of organic substances is thus rendered more difficult and may be impossible. Another disadvantage is the sensitivity of starch to iodine.

For these several reasons attempts have been made to use solutions of synthetic resins. For instance, Keigo Once, writing in J. Chem. Soc. Japan, Pure Chem. Sect. (Nippon Kagaku Zassi) 73 (1952), pp. 337–339, as reported in Chem. Zentralblatt 1956, describes experiments with aqueous solutions of polyvinyl alcohol as a binder for sorbent coatings.

However, one objection to the use of binder solutions in the preparation of separatory layers is that the properties of the sorbents are affected and impaired by the binders. When the sorbent suspension in the binder solution dries, the binder precipitates on the surface of the sorbent grains. Since this surface is decisively important in determining the behavior of the sorbent during chromatography, the product thus obtained cannot be compared with the original sorbent.

Water-soluble binders, such as polyvinyl alcohol, are also undesirable because they render the use of aqueous washes more difficult.

Finally, it has already been propsed to produce chromatographic elements by mixing together a fine dry sorbent and a dry plastics powder (polyethylene) and then sintering the mixture. However, from the production point of view, this method is difficult and unsatisfactory to carry out and the elements thus obtained leave much to be desired in various respects.

The finding of suitable binders is a task rendered more difficult by the extremely stringent demands which the special conditions of layer chromatographic work impose. The binders must not only provide the sorptive layers with satisfactory adhesive power and mechanical strength, the layers must also be insoluble, heat resistant and chemically inert. Solvent and water resistance is essential to permit elution, particularly in preparative layer chromatography for the isolation of substances, to prevent the binders from being washed out together with these substances and from causing trouble during their subsequent purification, and in analytical layer chromatography to insure clean separations.

An enumeration of some of the more conventional solvents, namely benzene, chloroform, methanol, cyclohexane, ethanol, ammonia solution, propanol, ethyl acetate, acetone, hexane, water and mixtures thereof will indicate that the binders are required to be insoluble under substantially any conditions. At the same time, they must be chemically inert to enable them to withstand chemical attack by aggressive reagents used for detection, to prevent the separatory layer from being discolored when the spots of substance are developed and to permit the SRS (separation - reaction - separation) technique to be performed which can be used for the rapid recognition of chemical changes of individual substances in a mixture after irradiation or exposure to gas or heat. Chemical resistance at elevated temperatures is also needed to permit substances to be rendered visible by spraying with aggresive reagents, such as concentrated acids, particularly sulphuric acid, ammonium chloride solution, etc., and then heating to temperatures exceeding 100°C. Heat resistance is also most desirable to permit the sorptive substances— apart from cellulose — to be heated for awhile at temperatures between 50° and 110°C. or more for achieving their maximum activity.

DETAILED DESCRIPTION

It is therefore the object of the present invention to provide elements for layer chromatography that contain binders which fully satisfy all the above requirements, that is to say, which impart to the elements a satisfactory degree of mechanical strength and wear resistance as well as power to adhere to bases, particularly in foil or sheet form, which are chemically and thermally stable. Insensitive to water and organic solvents, and which, above all, do not adversely affect the chromatographic properties of the sorptive substances.

Unexpectedly, it has been found that the above object can be satisfactorily achieved by introducing a synthetic resin binder in the form of a dispersion of a polymer that can be cross-linked or that will cross-link of its own accord. At points of contact the particles of sorptive substance are bonded, cemented or otherwise anchored together or to a base by discrete synthetic resin particles when the dispersions dry, but the surface of the particles or sorptive substance remain substantially free of binder and the sorbent, layers retain their porosity.

The proposed method therefore consists in thoroughly mixing, while avoiding coagulation, a suspension of the finely divided sorptive substance with 0.1 to 20% by weight, preferably 0.5 to 10% by weight (solid/solid) of a very fine dispersion containing little emulsifiers, stabilizer and plasticizer, of a chemically inert, solvent-resistant synthetic resin that is cross-linkable, or partially cross-linked, or that will spontaneously cross-link, or of its preliminary product, shaping the mixture to form the desired elements and drying the same. the synthetic resin being then cured to form cross-links in conventional manner, possibly by submitting the dried element to a thermal treatment.

According to the invention, the chromatography elements comprise a layer of adsorbent particles which are fixed with each other and the carrier, if any, by binder particles, the binder being a cross-linked polymer which is insoluble in water and organic solvents, and chemically inert.

A large variety of aqueous dispersions of polymers or of their preliminary products can be obtained in the trade, such as polymers based on vinyl chloride, vinylidene chloride, vinyl esters, vinyl ethers, acrylates, methacrylates, aromatic vinyl compounds, such as styrene, iso-olefins, such as iso-butylene, copolymers of the above compounds, such as copolymers of vinyl chloride and acrylates, vinylidene chloride and butyl acrylate, synthetic elastomers, such as copolymers of butadiene and styrene, butadiene and acrylonitrile as well as copolymers of dienes and a prepronderant proportion of styrene and/or acrylonitrile or other vinyl compounds, as well as ethylene-α-olefin copolymers, polytrifluorochloroethylene and so forth.

From among these dispersions the invention proposes to select those that are very finely dispersed, i.e. which have average particle sizes in the order of $10^{-3}$ mm and less, preferably of $10^{-4}$ mm Moreover, in view of the above-mentioned chromatographic requirements the dispersions should not contain major quantities of emulsifiers, stabilizers, thickeners or like additives.

To what extent the synthetic resins should be chemically inert, solvent-resistant and thermally stable will depend upon the contemplated particular use to which they are to be put. For universal applicability, their stability should certainly be as high as possible, as will be readily understood from what has been said.

Some of the above-mentioned synthetic resins will not possess the required stability immediately their dispersions have dried, and they must first be transformed to a useful material by cross-linking, hardening, after-polymerization, after-condensation or similar reactions, particularly with the application of heat.

With reference to these further reactions, the reader may be referred to the literature, for instance to Ullmanns Encyclopaedic der technischen Chemie, Vol. 11, pp. 8/9 (1960). Cross-linking considerably changes the properties of the high molecular weight products more particularly by depriving them of their solubility and thermoplasticity.

Of particular utility to the invention are acrylate and methacrylate copolymers which in the polymer structure contain monomers having reactive groups, and which can thus undergo subsequent reactions. Cross-linking after application of the polymers makes for better strength and solvent stability of the coatings and films. Suitable reactive monomers are compounds which in addition to a polymerizable double bond also bear one or more amide, N-methylol amide, melamine, amino, epoxy, chlorohydrin, chloroalkyl or other groups. Examples of such monomers are β-aminoethyl acrylate, acrylamide, N-methylolacrylamide or methacrylamide, an N-methyloloacrylamide ether, particularly the butyl ether, Mannich bases of N-methylacrylamide and secondary amines, glycol monoacrylate, vinyl isocyanate, glycidyl methacrylate, 2-tris(chloromethyl)ethylacrylate. They may continue reacting inter se or with additional di- or poly-functional lower or higher molecular weight substances. Polyacrylates and polymethacrylates may also be cross-linkable, particularly if they contain very small quantities of acrylamides or methacrylamides or derivatives thereof which then function as cross-linking agents.

Particularly valuable are the spontaneously cross-linking synthetic resins. Dispersions are understood to be spontaneously cross-linking when the chains between which the cross links are to form contain suitable reactive groups. Distinguished from these spontaneously cross-linking dispersions are cross-linkable dispersions into which foreign cross-linking agents based on polyisocyanates, polyepoxides or aminoplastic precondensates must be added. These and other cross-linkable polymers usable in the present invention are known per se—cf. Ullmanns Encyklopadie der technischen Chemie, Vol. 11, pp. 8/9 (1960), and Ullmann 1. c., Vol. 14, p. 274 and 295/96.

Cross-linkable synthetic resins—in the form of dispersions—that can be used include polyvinyl compounds containing reactive side groups. Reactive side groups are understood to be groups which cause cross-linking of the polymers by acid catalysis or at elevated temperature. Such compounds are for instance acrylic resins, such as polyacrylates and polymethacrylates. Other resins, such as those based on vinylidene chloride, vinyl ether, styrene and so forth, can be used while obtaining some of the advantages of this invention.

These cross-linked products are so stable that surprisingly they permit the layers in which they are contained to be sprayed with dilute or concentrated acids, such as concentrated sulphuric acid, and then heated without impairing the reactions for the detection of the separated substances. Although the binder is of an organic nature, the separatory layers remain white. The binders are also stable to other detecting reagents frequently used in layer chromatography, such as phosphoric acid, perchloric acid, antimony chloride, anisealdehyde-sulphuric acid p-toluenesulphonic acid, phosphomolybdic acid, phosphotungstic acid, etc.

The shaped elements may also be dried with the application of heat so that these two procedural steps coincide.

Any substance may be used as a sorptive substance that is conventionally so used in analytical and preparative layer chromatography. More particularly, such substances include silica gel. kiesclguhr, alumina, magnesium silicates, calcium phosphate, cellulose and cellulose derivatives, polyamides or polycarbonates, natural and synthetic ion exchangers and so forth. The sorptive substances used for the preparation of the separatory layers must be adapted to existing requirements with respect to grain size distribution and surface structure, so is the case in specially prepared and standardized sorbents.

Appropriate bases for the separatory layers may be glass, synthetic plastics and metal plate, metal and plastics foils, metallized and plastics-lined papers and similar substrates. The use of plastics sheets was illustratively described for instance by Robert L. Squibb in Nature 199, No. 3899 (1963) 1215 and loc. cit. no. 4877 (1963) 317.

Primarily appropriate as a liquid for forming the suspension or dispersion is water or an aqueous mixture. This may also contain swelling agents or other substances for improving the adhesive properties, provided they are fugitive or will not interfere with the performance of the layer chromatography.

Without intending to limit the invention to a particular theory, the following may be noted: As is well-known in the plastics art, film cannot be formed from a plastics dispersion unless the polymer particles suspended in the water are still liquescent and fuse at the instant of coagulation of the dispersions. By a suitable choice of the working conditions, as is known in the art, "cold flow" can be controlled and hence the formation of a closed coherent film avoided.

The quantitative ratio of binder to sorbent also affects the properties of the layer. A useful measure for this ratio is the pigment volume concentration which is used in the lacquer and paint making industries, and which represents the volumetric concentration of the pigment in percent of the total volume of the layer, i.e., of the non-volatile portion of the layer composition. Important in this connection is the critical pigment volume concentration at which many properties of the layer discontinuously change. In the concentration ranges the invention proposes to use, the ratio binder/sorbent is usually well below the critical point.

For performing the proposed method, other acrylic-type resin resistant organic binders may also be added, such as polyacrylamides and polymethacrylamides and their derivatives and copolymerization products.

In order to facilitate the detection of colorless substances that absorb in the ultraviolet region, it is possible to incorporate in the layers inorganic and organic fluorescent substances or fluorescent indicators, such as heavy-metal-activated zinc silicate and morin, so that the adsorbate bands will contrast with the fluorescent surface by differences in intensity when the layers are irradiated with light of appropriate wavelength.

In the case of acrylic resin dispersions, additions—depending upon the sorptive substance used —of between 0.5 and 10% are sufficient for achieving adequate adhesive power. Owing to their adhesive strength, they are principally suited for application to flexible sheets and foils.

A special mode of the proposed method is therefore characterized by the use of binders consisting of aqueous dispersions of spontaneously cross-linking copolymers of low-molecular-weight acrylic-type resins, such as acrylamides and/or methacrylamides or of their N-methylol compounds.

Alternatively, mixtures of different dispersions may be used in order to modify the properties of the film, particularly its adhesion and hardness as may be desired.

The invention will be hereinafter illustrated by the description of a number of examples.

In the following Examples 1 to 4, a roughly 50% aqueous dispersion of a spontaneously cross-linking synthetic resin based principally on lower-molecular-weight weakly anionic polyacrylates having a pH of about 4.5 and a Brookfield viscosity of about 300 cP were used, the unfilled dispersions giving colorless transparent soft and slightly sticky films at temperatures above 20° C. which are insoluble in organic solvents and become insoluble in water and organic solvents after cross-linking has taken place in heat and then exhibit hardly any thermoplasticity. Polyacrylate resin dispersions of identical or substantially corresponding properties are available commercially in West Germany from a number of manufacturing sources, including Synthemul 51/505, 506 and 507 (manufacturers: Reichhold-Albert-Chemie AG, Hamburg, Fed. Rep. of Germany), and Acronal 30 D (manufacturers: Badische Anilin- und Soda-Fabrik, Ludwigshafen, Fed. Rep. of Germany). It will be understood that such commercial products, while preferably corresponding to the data set out above, may vary in concentration and viscosity values, which may be somewhat lower or higher. The patent literature also describes such cross-linkable polyacrylate dispersions. See, for example, U.S. Pat. No. 2,880,116, or German Auslegeschrifts DAS 1,047,431, 1,110,606 and 1,102,404.

EXAMPLE 1

30 g of a silica gel are stirred into 70 ml of water until a homogeneous suspension is obtained. With vigorous shaking 3 ml of the above polyacrylate dispersion are then added. The proportion of binder related to the silica gel is 5%.

The flowable mass is run onto a plastics foil from a slit nozzle 250 μ wide in a coating machine. After having dried, the resultant chromatographic foil has an active layer which is satisfactorily wear-resistant and strong. It can be handled and stacked without trouble and it is resistant to spraying with aggressive reagents, such as the substances that have been mentioned above. Furthermore, the coating is highly resistant to aqueous washes and it is not or only very sparingly soluble in organic solvents. Also, the carbonization technique—involving spraying with concentrated sulphuric acid and heating to 110°–120° C.—can be readily performed. The chromatographic properties of the silica gel remain substantially unchanged.

EXAMPLE 2

60 g of an aluminum oxide are stirred into 60 ml of distilled water. With vigorous shaking 0.6 ml of the polyacrylate dispersion are added to this dispersion. The proportion of binder is about 0.5% related to the aluminum oxide used. The coating is applied as described in Example 1. The results are comparable with those obtained in Example 1.

EXAMPLE 3

15 g of cellulose powder are stirred into 80 ml of distilled water to form a paste to which 3 ml of the polyacrylate dispersion are added. The proportion of binder related to the powdered cellulose is about 10%. The results are comparable with those obtained in Example 1.

EXAMPLE 4

15 g of polyamide powder are stirred into 35 ml of distilled water to form a paste to which 0.3 ml of the polyacrylate dispersion are added. The proportion of binder related to polyamide is 1%. The results are comparable with those obtained in Example 1.

EXAMPLE 5

The dispersion is obtained according to U.S. Pat. No. 2,880,116 to Rohm & Haas (1955) by emulsion polymerization of 75 parts ethyl acrylate, 15 parts isobutyl acrylate and 10 parts diethyl aminoethyl methacrylate. Copolymerisats of ethyl or butyl acrylate with other tertiary aminovinyl monomers, e.g. 2-dimethyl aminoethyl acrylate, may be used. The procedure is otherwise the same as in Example 1.

EXAMPLE 6

According to German Auslegeschrift DAS 1,047,431 to BASF (1958), noncoagulating dispersions of cross-linked synthetic resins, which give films resistant to $H_2O$ and solvents, are obtained by copolymerizing N-(hydroxymethyl)methacrylamide with other polymerizable compounds in aqueous dispersion at pH <5. Other unsaturated carboxamides and their N-hydroxymethyl compounds can be used. For example, 5 parts N-(hydroxymethyl)methacrylamide in 95 parts butylacrylate, 1 part $K_2S_2O_5$ and 2 parts of a Na sulfonate of a $C_{12-18}$ paraffinic acid were dispersed in 500 parts $H_2O$; at 80°, 15 parts N-(hydroxymethyl)methacrylamide in 285 parts butyl acrylate and 3 parts $K_2S_2O_5$ and 6 parts of said Na sulfonate in 100 parts $H_2O$ were added during 45 min. The mixture was kept at 80°-90° for 1 hr. At first, the pH was 6.5. After the polymerization it was 3,5. The dried polymer shows an excellent resistance to water, organic solvents, and aggressive agents. This demonstrated that the dispersion was usable in the procedure of Example 1.

EXAMPLE 7

The polymerization product is obtained according to German Auslegeschrift DAS 1,110,606 to BASF (1959): 1-25% N-(hydroxymethyl)acrylamide and 99-75% of one or more other polymerizable compounds are reacted, for instance a 40% aqueous dispersion of a copolymer of 80 parts butylacrylate, and 5 parts N-(hydroxymethyl)acrylamide, and 6 parts $MgCl_2$. The procedure for using the dispersion was the same as the foregoing examples.

EXAMPLE 8

An aqueous dispersion of a copolymerisate of N-methylene-N-methylmethacrylamino dimethylamide is prepared according to German Auslegeschrift DAS 1,102,404 to Farbenfabriken Bayer (1958). For example, 10 g of a reaction product of 15–20 mol ethylene oxide and 1 mol o-hydroxydiphenylmethane together with 10 parts of the natrium salt of a long-chain paraffin sulphonic acid are dissolved in 500 g salt-free $H_2O$. After adjusting the pH value to 8 by the addition of 0.5 g natrium hydroxide, 140 g styrene, 200 g butyl acrylate, 45 g acrylonitrile and 16 g N-methylene-N-methyl-methacryl-amido dimethylamine are mixed and added to the aqueous phase while stirring. The polymerization is initiated by the addition of 0.15 g triethanolamine and 0.30 g kalium peroxosulfate at a temperature of 50° C. After 5 hours a conversion of 97% is achieved. When dried, this dispersion gives a product which is soluble in organic solvents, but can be cross-linked rapidly at a temperature of 120°–130° C. to an insoluble polymer, and cannot therefore be used in the method of this application, as illustrated by the foregoing examples.

As shown by German Auslegeschrift DAS 1,047,431, the polyacrylates may be at least partially cross-linked in the dispersion, the polymer particles having sufficient adhesiveness when the adsorbent layer is prepared, but irreversibly becoming insoluble when dried. Therefore, it is not essential to completely delay the cross-linking of the polymer until after the shaping of the elements of drying them. The chemically-inert, solvent resistant polymer can be cross-linked, or such that it can be cross-linked, or such that it cross-links spontaneously.

We claim:

1. A thin layer chromatographic element providing a coating on a base sheet containing particles of a chromatographic sorptive substance in a form effective for thin layer chromatography, wherein the improvement is characterized by said coating having been prepared and applied by intermixing a substantially homogeneous water suspension of said particles of sorptive substance with a water dispersion of discrete particles of an acrylic resin capable of undergoing cross-linking to an insoluble state, said acrylic resin particles having an average size of not over $10^{-3}$mm. and being present in an amount of from 0.1 to 20% by weight of said sorptive substance, said mixing being carried out while said resin particles remain dispersed to produce a flowable mass with said sorptive substance particles and said resin particles uniformly distributed therein, and applying said flowable mass to said base sheet to form a thin layer coating thereon, said sorptive particles substantially retaining their chromatographic sorptive properties while being bound together and to said base sheet by said resin having undergone cross-linking.

2. The chromatographic element of claim 1 wherein said resin is present in an amount of 0.5 to 10% by weight of said sorptive substance.

3. The chromatographic element of claim 1 in which said resin is a polyacrylate resin capable of spontaneous cross-linking.

* * * * *

UNITED STATES PATENT OFFICE
CERTIFICATE OF CORRECTION

Patent No. 3,922,431      Dated November 25, 1975

Inventor(s) EDMUND RADMACHER and PAUL WOLLENWEBER

It is certified that error appears in the above-identified patent and that said Letters Patent are hereby corrected as shown below:

Please correct the spelling of the second-named inventor from "Paul Wullenweber" to --Paul Wollenweber--.

Signed and Sealed this sixth Day of April 1976

[SEAL]

Attest:

RUTH C. MASON
*Attesting Officer*

C. MARSHALL DANN
*Commissioner of Patents and Trademarks*